(12) United States Patent
Mironov et al.

(10) Patent No.: US 7,505,588 B2
(45) Date of Patent: Mar. 17, 2009

(54) STREAM CIPHER DESIGN WITH REVOLVING BUFFERS

(75) Inventors: Ilya Mironov, Mountain View, CA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 10/815,572

(22) Filed: Mar. 31, 2004

(65) Prior Publication Data

US 2005/0220302 A1 Oct. 6, 2005

(51) Int. Cl.
*H04L 9/00* (2006.01)
(52) U.S. Cl. .............................. 380/42; 380/28; 714/808
(58) Field of Classification Search ...................... 713/1, 713/2, 188, 194; 380/200, 201, 255, 277, 380/28, 42; 726/2; 714/808
See application file for complete search history.

(56) References Cited

U.S. PATENT DOCUMENTS

| | | | | |
|---|---|---|---|---|
| 5,724,427 | A * | 3/1998 | Reeds, III | 380/259 |
| 6,496,928 | B1 | 12/2002 | Deo et al. | |
| 6,646,639 | B1 * | 11/2003 | Greene et al. | 345/422 |
| 7,170,997 | B2 * | 1/2007 | Petersen et al. | 380/268 |
| 7,230,978 | B2 * | 6/2007 | Bitterlich et al. | 375/219 |
| 2002/0118827 | A1 * | 8/2002 | Luyster | 380/37 |
| 2003/0158875 | A1 | 8/2003 | Hars | |
| 2006/0008086 | A1 * | 1/2006 | Kevenaar et al. | 380/43 |

OTHER PUBLICATIONS

Alon, N., Roichman, Y.; "Random Cayley Graphs and Expanders" RSA: Random Structures & Algorithms; Jan. 7, 1997; 15 pgs.

Courtois, N.; "Algebraic Attacks on Combiners with Memory and Several Outputs" Published on the internet at http://eprint.iacr.org/2003/125/. Presented at Crypto 2003, 17 pgs.

Golic, J. Dj.; "Cryptanalysis of Alleged A5 Stream Cipher" Springer-Verlag, 1998, pp. 239-255.

Halevi, S., Coppersmith, D., Jutla, C.; "Scream: a software-efficient stream cipher" Published on the internet at http://eprint.iacr.org/2002/019.pdf. Jun. 2002, pp. 1-21.

Rogaway, P., Coppersmith, D.; "A Software-Optimized Encryption Algorithm" Journal of Cryptology: the journal of the International Association for Cryptologic Research, 1994, Revised Sep. 1997, 16 pgs.

Menezes, A., van Oorschot, P., Vanstone, S.; "Handbook of Applied Cryptography" CRC Press, 1996/1997; Chapter 1 "Overview of Crytography" pp. 1-48.

Menezes, A., van Oorschot, P., Vanstone, S.; "Handbook of Applied Crypotography" CRC Press, 1996/1997; Chapter 6 "Stream Ciphers" pp. 191-222.

* cited by examiner

*Primary Examiner*—Kimyen Vu
*Assistant Examiner*—Joseph Pan
(74) *Attorney, Agent, or Firm*—Lee & Hayes, PLLC

(57) ABSTRACT

Techniques are disclosed to limit short-term correlations associated with outputs of stream cipher keystream generators. Output values of a generator are paired such that the paired outputs are sufficiently far apart to be considered independent. In one described implementation, a method includes sequentially storing a plurality of results provided by a stream cipher output rule in a first, second, and third storage units. A pairing function pairs individual values from the first and third storage units that are at least a threshold value apart. Upon reaching the threshold value of the output rule results, the contents of the first, second, and third storage units are rotated serially.

40 Claims, 6 Drawing Sheets

STREAM CIPHER DESIGN WITH REVOLVING BUFFERS

TECHNICAL FIELD

The present invention generally relates to cryptology, and more particularly, to utilization of revolving (or rotating) buffers in stream ciphers.

BACKGROUND

As digital communication becomes more commonplace, the need for securing the associated communication channels becomes increasingly more important. For example, current technologies allow a user to remotely access bank accounts, medical data, and other private and sensitive information.

Cryptology has been widely used to provide secure digital communication. Cryptology generally relates to the enciphering (or encrypting) and deciphering (decrypting) of messages. The encryption and decryption uses some secret information (such as a key). In different encryption methods, a single key or multiple keys may be used for encryption and decryption.

Currently, two types of ciphers are in common use. A block cipher operates on a large block of data. A stream cipher, on the other hand, operates on relatively smaller units of text (such as bits). Depending on its implementation, stream ciphers can be much faster than block ciphers.

Stream ciphers have become of special interest recently because the stream generated by them (also known as keystreams) approach the high security of one-time pad or Vernam cipher. Generally, one-time pad cipher generates a keystream with the same length as the text message being encrypted. The one-time pad keystream is believed to be completely random, yielding very high security levels, but suffers from memory overhead that may be undesirable for some applications.

Stream ciphers are usually built around a pseudo-random number generator. The cipher needs to be resistant to attacks, which rules out many efficient and statistically good generators that are suitable for simulation.

Accordingly, the current solutions fail to provide an efficient methodology for quick and secure data encryption/decryption using stream ciphers.

SUMMARY

Techniques are disclosed to limit short-term correlations associated with outputs of stream cipher keystream generators. Output values of a generator are paired such that the paired outputs are sufficiently far apart to be considered independent.

In one described implementation, a method includes sequentially storing a plurality of results provided by a stream cipher output rule in a first, second, and third storage units. A pairing function pairs individual values from the first and third storage units that are at least a threshold value apart. Upon reaching the threshold value of the output rule results, the contents of the first, second, and third storage units are rotated serially.

In another described implementation, relatively simple updates are combined with efficient output rules (such as those that are enhanced by the pairing function) to strengthen stream cipher constructions and/or construct a variety of new ciphers.

BRIEF DESCRIPTION OF THE DRAWINGS

The detailed description is described with reference to the accompanying figures. In the figures, the left-most digit(s) of a reference number identifies the figure in which the reference number first appears. The use of the reference numbers in different figures indicates similar or identical items.

DETAILED DESCRIPTION

The following discussion assumes that the reader is familiar with cryptography techniques. For a basic introduction of cryptography, the reader is directed to a text written by A. Menezes, P. van Oorschot, and S. Vanstone entitled, "Handbook of Applied Cryptography," fifth printing (August 2001), published by CRC Press.

The following disclosure describes efficient techniques for limiting local (or short-term) correlations associated with outputs of stream cipher keystream generators. The techniques are based on pairing the generator outputs that are sufficiently far apart to be considered independent. In an implementation, absence of short cycles in a pairing graph substantially limits linear attacks and algebraic attacks, in part, because attackers are unable to isolate relatively short equations with few variables.

In one implementation, relatively simple updates (further discussed below in the section entitled "Update Rules") are combined with efficient output rules (e.g., as will be further discussed with reference to FIG. 2) to strengthen many known stream cipher constructions and/or construct a wide variety of new ciphers (e.g., by combining two or more of the processes that have desirable properties). Such implementations are envisioned to also be efficient in software.

Stream Cipher Overview

Figure 1:
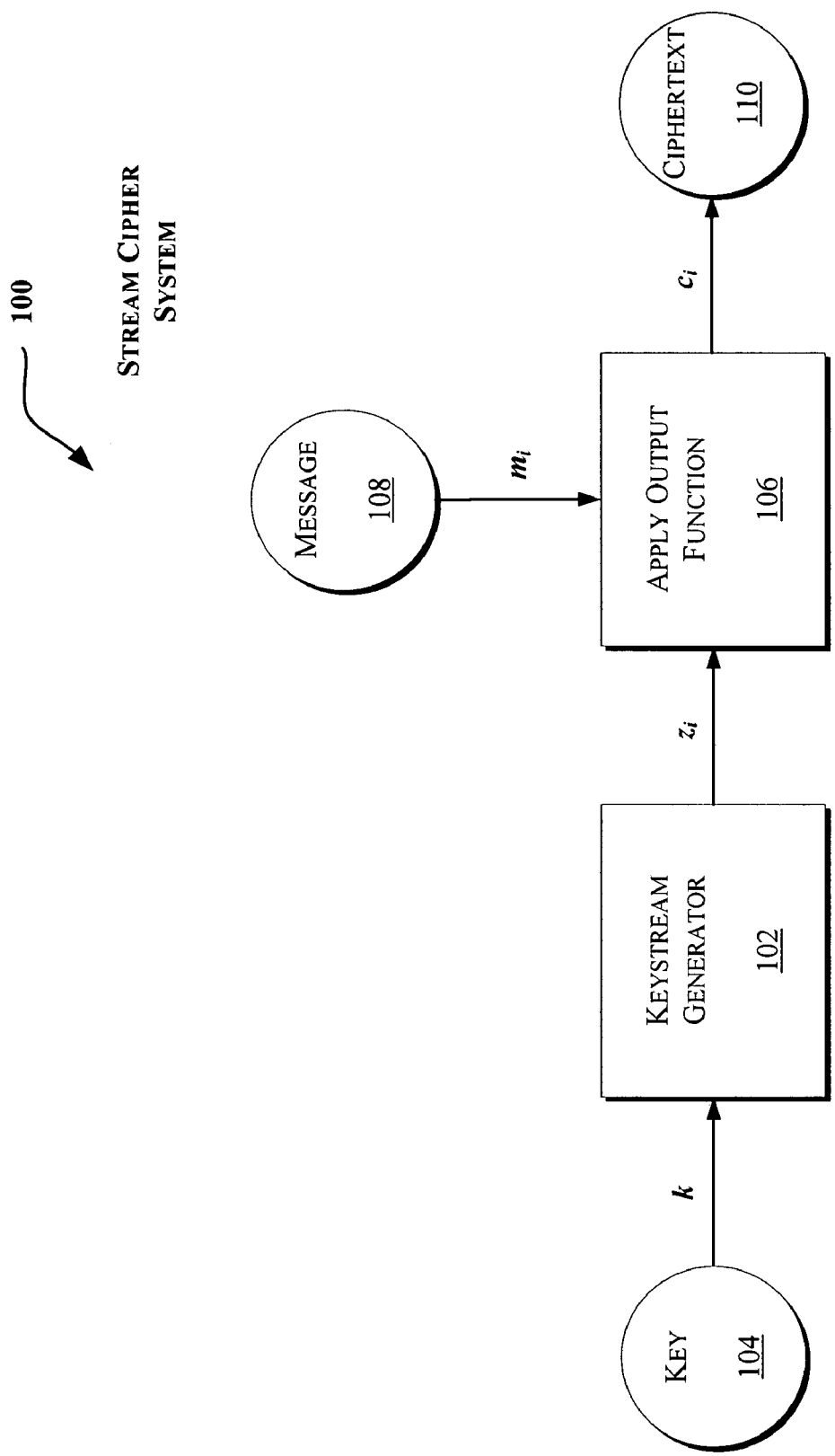
FIG. 1 illustrates an exemplary stream cipher system.

FIG. 1 illustrates an exemplary stream cipher system 100. The system 100 includes a keystream generator 102 which utilizes a key (k) 104 to generate a keystream ($z_i$). An output function is applied (106) to combine the generated keystream ($z_i$) and a message ($m_i$) 108 to produce a ciphertext (110). The generated keystream ($z_i$) varies with time and may be generated at random, from an initial small keystream (such as a seed), from a seed and previous ciphertext, or the like. The output function (106) may be applied to individual characters (or binary digits) of the message ($m_i$) one at a time.

Accordingly, the system 100 utilizes the generated keystream to encrypt the message ($m_i$) into ciphertext ($c_i$). Typical design of a stream cipher algorithm generally consists of three elements:

1. A rule for initializing the cipher's internal state $\Omega_0$ (e.g., by using a key such as 104 of FIG. 1 and/or random values);

2. E:$\Omega \rightarrow \Omega$, a mechanism for evolving or updating the state $\Omega$ (such as done by the keystream generator 102); and 3. H:$\Omega \rightarrow \{0,1\}^n$, an output rule for generating n-bit outputs (such as the keystream ($z_i$) generated by 102 of FIG. 1).

There are many possible trade-offs that should be carefully chosen in designing a secure and efficient cipher. In particular, there is a natural trade-off between the update rule E, and the output rule H. For example, if the state updates are very thorough, then the output may be a relatively simple function of the state, and vice versa.

In an implementation, relatively simple updates (further discussed below in n the section entitled "Update Rules") are combined with efficient output rules (e.g., as will be further discussed with reference to FIG. 2). For example, given a scenario with a fast update rule E and a simple output rule H, the evolving rule E is good in the long run, e.g., there is some characteristic time T such that after T applications of the rule, the state $E^T(\Omega_t)$ bears little or no resemblance to $\Omega_t$. Such technique may strengthen many known stream cipher constructions, or could be used to construct a wide variety of new ciphers, by combining two or more of the processes that have the above property. Such implementations are envisioned to also be efficient in software.

Revolving Storage or Buffers

Figure 2:
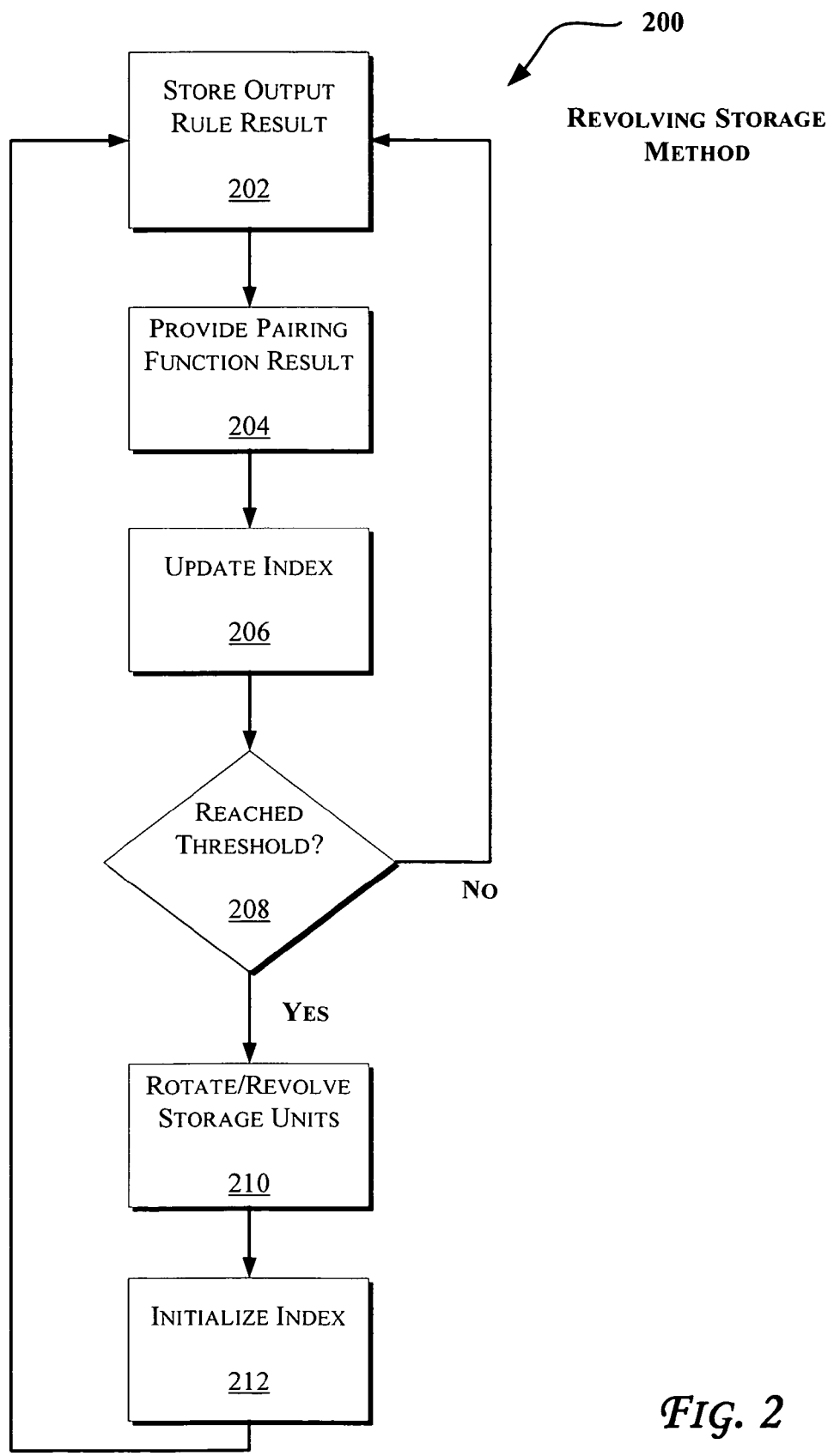
FIG. 2 illustrates an exemplary method for strengthening an output rule H through using revolving storage units.

FIG. 2 illustrates an exemplary method 200 for strengthening an output rule H through using revolving (or rotating) storage units. In an implementation, the method 200 improves the keystream generated by a keystream generator (such as 102 of FIG. 1). An element (such as individual characters or binary digits) generated by an output rule H is stored (202). Various types of devices or media may be utilized for storing the element such as a register, cache, or other types of memory (such as those discussed with reference to the computing environment of FIG. 7). The data stored may reside on a same device or different devices.

A pairing function p (which will be further discussed below under the same title) provides the pairing result (204) based on values stored in at least two corresponding storage units (such as those A and C illustrated in FIGS. 3 and 4). In one implementation, the pairing function can take more than two inputs. An index (e.g., utilized to index the storage units and/or the pairing function) is updated (206), e.g., by 1. If a given threshold (T) is not reached (208), e.g., as determined by comparing the updated index against a threshold value, the method 200 returns to the stage 202 to store a next element generated by an output rule H.

Otherwise, once the threshold is reached (208), the storage units are serially rotated (e.g., by shifting the stored values left or right) (210). In one implementation, to provide efficiency, the rotation is applied to pointers, thereby avoiding data movement (e.g., the storage units are merely renamed). Then, the index is initialized (e.g., to 0) (212), and the method 200 resumes at the stage 202 to store a next element generated by an output rule H. The method 200 may be performed until a keystream of a desired length is generated.

Accordingly, the output rule may be strengthened by a pairing function p that pairs two output elements that are at least T steps apart (i.e., a threshold amount apart such as discussed with reference to stage 208). By doing so, two observations of the internal state done T steps away from each other are assumed to be substantially unrelated for practical purposes. One solution would be to throw away intermediate results (such as those generated by the stage 202). Alternatively, the results may be stored in a storage unit (or buffer) and the output results suitably paired. One source of efficiency of this technique comes from the way the results are stored and paired.

Figure 3:
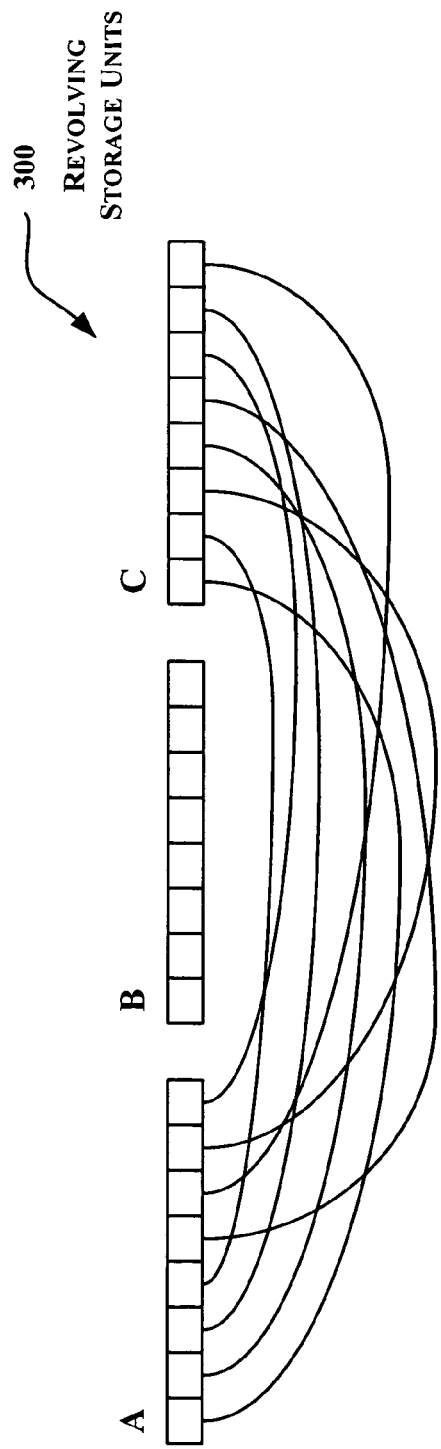
FIG. 3 illustrates exemplary pairing of the revolving storage units.
Figure 4:
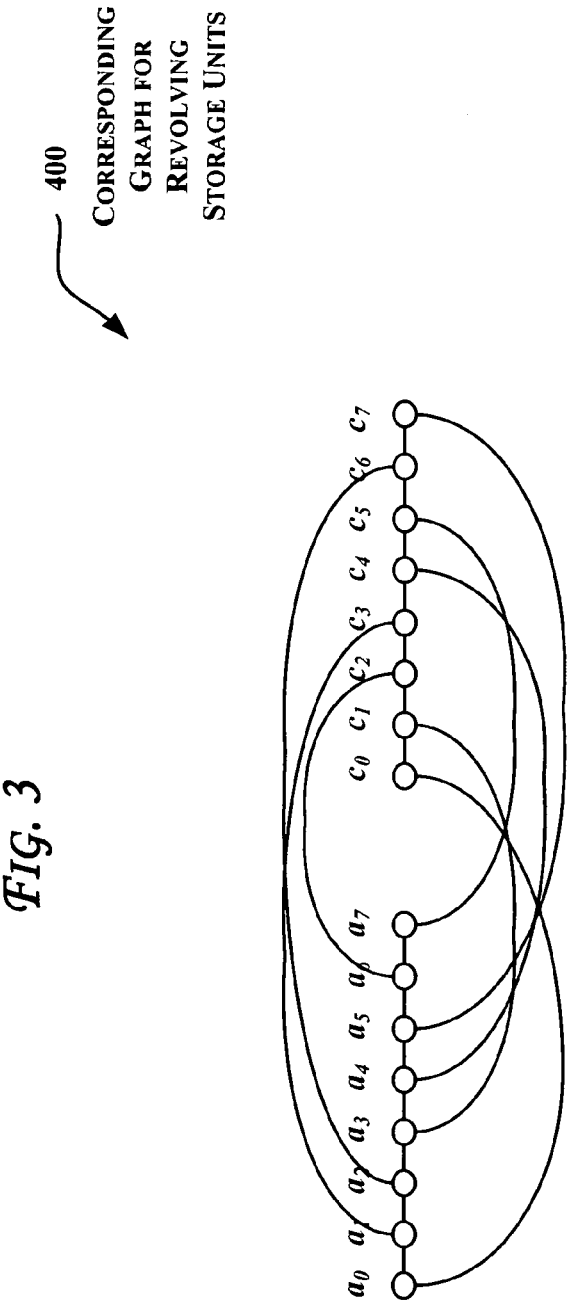
FIG. 4 illustrates an exemplary undirected graph corresponding to the pairing of the revolving storage units.

In one implementation, at any given time, there are three storage units of length T (or three portions within a same storage unit), which may be referred to as A, B, and C (FIG. 3). The results from a stream cipher output rule are stored (202) in the storage units sequentially (202). Every T cycles the content of the storage units are shifted to the left (A is discarded, B moves to A, C is emptied) or right (C is discarded, B moves to C, A is emptied). In such an implementation, only A and C arrays are actively read, while B sits idle until C is full (in case of shifting left). Accordingly, the following steps may be iterated as discussed with reference to FIG. 2 for the case of shifting the storage units left:

1. C[I]←element produced by the output rule H (202).
2. provide $p(A[n_i];C[i])$ (204).
3. i←i+1 (206).
4. if i=T(208), then A←B, B←C (210), i←0 (212).

The last operation may be efficiently implemented by rotating pointers to the three buffers in an implementation. In one implementation, the storage units A and B are initialized (e.g., with random values or values generated by the output function H) prior to performing the stages of method 200.

To define the pairing function p, a table $(i,n_i)$ of constants $n_i$ for $i \in \{0,T\}$ may be defined. First, an undirected graph G with vertices labeled $a_0, \ldots, a_{T_{-1}}$ and $c_0, \ldots, c_{T_{-1}}$ may be defined (FIG. 4). Second, edges $(a_i, a_{i+1})$ and $(c_i, c_{i+1})$ are added for $0 \leq i \leq T-1$ and $(a_{n_i}, c_i)$ for $0 \leq i \leq T$. The pairs $(n_i, i)$ are such that the girth of graph G is relatively large (where the girth is generally the length of the shortest cycle in G). It is envisioned that multi-argument functions may be utilized instead of, or in addition to, the pairing function. Moreover, the function may take more than two arguments (e.g., one from each buffer).

Pairing Function

With respect to the pairing function p: $\{0,1\}^n \times \{0,1\}^n \to \{0,1\}^n$, for each x, the function $y \to p(x,y)$ is one-to-one. Similarly, for each y, the function $x \to p(x,y)$ is a bijection as well. In an implementation, the function is computationally efficient and is not symmetric on its inputs. Some exemplary choices for the pairing function are:

A: $p(x,y)=x \oplus S[y]$, where S is a fixed permutation table.

B: $p(x,y)=x \oplus (ay+b)$, where a and b are two constants, and a is odd. This operation may be implemented efficiently using SSE (streaming SIMD (single instruction multiple data) extension) available in some of the current processors (such as discussed with reference to the processing unit 704 of FIG. 7).

C: $p(x,y)=\gamma$, $\delta$ is chosen as a nearly universal hash function by the iteration of the following rules:

$$\alpha = ax \bmod 2^{2n}$$

$$\beta = by \bmod 2^{2n}$$

$$\gamma = \alpha^L + \beta^R \bmod 2^{2n}$$

$$\delta = \alpha^R + \beta^L \bmod 2^{2n},$$

where $x^L$ and $x^R$ respectively denote the left and right halves of x, and a, b are chosen randomly.

The graph G schematically reflects the relations that are known to an adversary: $(a_i, a_{i+1})$ and $(c_i, c_{i+1})$ are connected through the updates of the internal state, and $(a_{n_i}, c_i)$ are arguments of the pairing function.

Since the pairing function is a bijection in both of its arguments, knowing its exact value does not leak any information about any of its arguments. If there is not any cancellation occurring while composing the function, one of the best relationships one can derive would involve at least k inputs (the girth of the graph). Indeed, for any m<k outputs $z_0$=pair $(x_0, y_0)$, $z_1$=pair $(x_1, y_1)$, ..., $z_m$=pair $(x_m, y_m)$ there may be many input pairs $(x_0, y_0), \ldots, (x_m, y_m)$ that result in these outputs.

In an implementation, the table $n_i$ is constructed off-line and therefore may be chosen to maximize the graph's girth. Heuristically, setting $n_i=c*i \mod T$, where c is an increment coprime with T, produces desirable results as will be further discussed below. In one implementation, such techniques provide lossless results in the sense that the output is byte-for-byte the same size as the input.

Parameters: Buffer Size, Graph Properties

Figure 5:
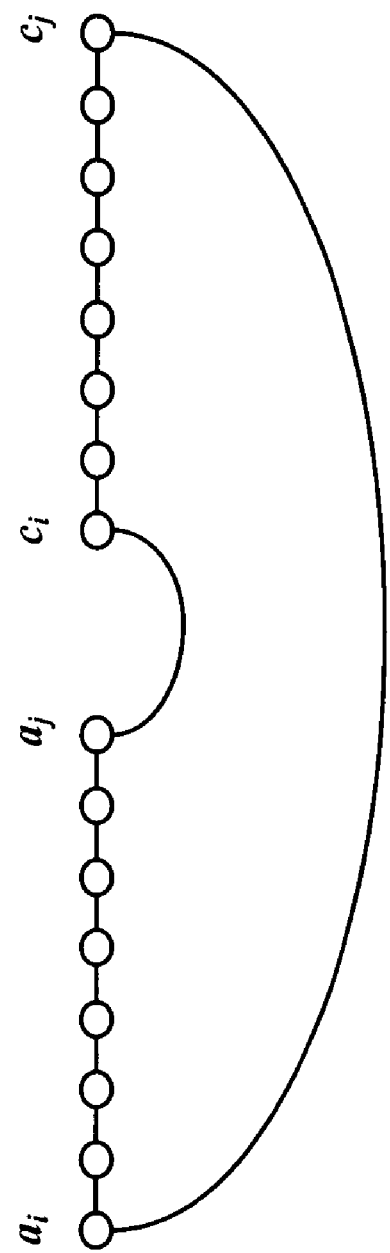
FIG. 5 illustrates an exemplary shortest "simple" cycle graph corresponding to the revolving storage units.

A graph's girth is one of the main characteristics of the graph G which details the known relationship between elements output by the generator. Another parameter important for thwarting a linear attack (which approximates the update rule E with a linear operator) is the shortest "simple" cycle, e.g., a cycle that has exactly two applications of the pairing function, (illustrated in FIG. 5).

By considering the graphs defined as $n_i=c*i \mod T$, where c is an increment coprime with T, it may be relatively easy to exhaustively search possible increments. Table 1 below lists exemplary increments for which the girth and the minimal "simple" cycle are maximized (for n=8, 16, 32, 128). Table 1 lists c smaller than n/2 only.

TABLE 1

Properties of the Graph G.

| Buffer Length | Increment | Girth | Min. Simple Cycle |
| --- | --- | --- | --- |
| T = 8 | c = 3 | 6 | 4 |
| 16 | 3, 5, 7 | 6 | 6 |
| 32 | 7, 9 | 8 | 10 |
| 64 | 19, 27 | 8 | 12 |
| 128 | 15, 17, 47, 49 | 8 | 18 |

Additional Buffers

Figure 6:
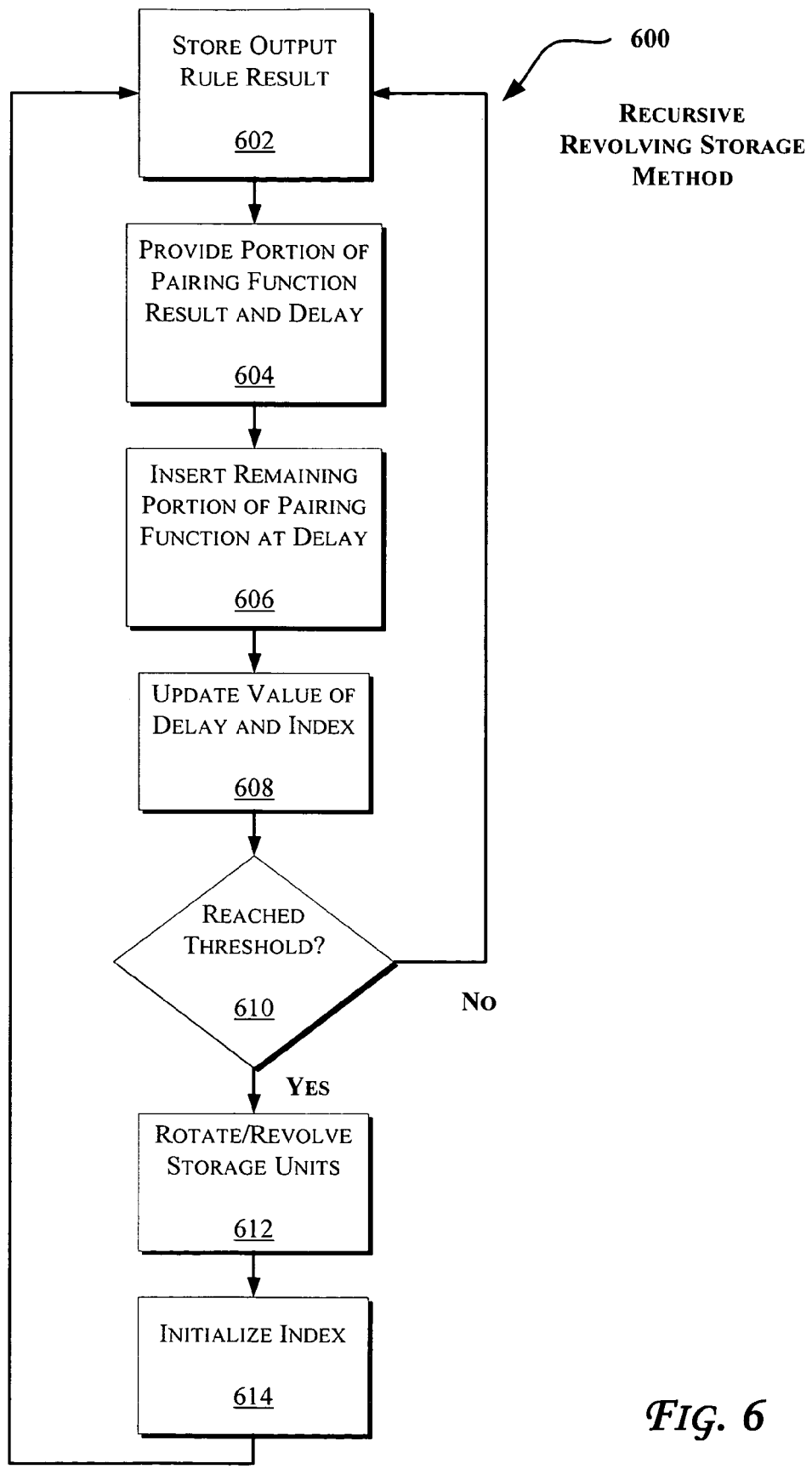
FIG. 6 illustrates an exemplary method for strengthening an output rule H by recursively revolving the storage units.

FIG. 6 illustrates an exemplary method 600 for strengthening an output rule H through revolving (or rotating) the storage units recursively. As illustrated in FIG. 6, in one implementation, trading the complexity of the output rule H for an added layer including delay buffers and a pairing function can be applied recursively. Also, the pairing function may be simplified by adding another buffer, walked through using a one-cycle secret permutation. The secret permutation may be slowly mutating. In an implementation, the method 600 improves the keystream generated by a keystream generator (such as 102 of FIG. 1).

A delay buffer D may be utilized which is initialized with random values along with a variable delay. In an implementation, an update function delay=S[delay] where S is a random permutation with one cycle. As illustrate in FIG. 6, the following steps may be iterated for the case of shifting the storage units left:

1. C[i]←element produced by the output rule H (602).

2. Provide a portion of the pairing function p(A[$n_i$];C[i]) (e.g., left half) and D[delay] (604).

3. Insert remaining portion of paring function (e.g., right half) at position delay of buffer D (D[delay]) (606).

4. Update value of delay and set i←i+1 (608).

5. if i=T(610), then A←B, B←C (612), i←0 (614).

Of course, similar steps may be iterated for the case of shifting the storage units right (e.g., providing a right half at step 2, inserting the left half at step 3 and shifting the storage units right at the step 5). Moreover, the last operation may be efficiently implemented by rotating pointers to the three buffers in an implementation. Furthermore, as discussed with reference to FIG. 2, the storage units A and B may be initialized (e.g., with random values or values generated by the output function H) prior to performing the stages of method 600.

Accordingly, an element (such as individual characters or binary digits) generated by an output rule H is stored (602). As discussed with reference to FIG. 2, various types of devices or media may be utilized for storing the element such as a buffer, register, cache, or other types of memory. A portion of the pairing function p result and a delay value (D[delay]) are provided (604) (e.g., values stored in at least two corresponding storage units such as those illustrated in FIGS. 3 and 4). The remaining portion of the pairing function is inserted in the delay buffer (as indexed by delay, e.g., D[delay]) (606). An index utilized to index the storage units and the pairing function and the index to the delay buffer (delay) are updated (608).

If a given threshold is not reached (610), e.g., as determined by comparing the updated index against a threshold value, the method 600 returns to the stage 602 to store a next element generated by an output rule H. Otherwise, once the threshold is reached (as determined by 610), the storage units are rotated (e.g., by shifting the stored values left or right) (612). Then, the index is initialized (e.g., to 0) (614), and the method 600 resumes at the stage 602 to store a next element generated by an output rule H. The method 600 may be performed until a keystream of a desired length is generated.

Update Rules

As discussed above with reference to FIGS. 2 and 6, revolving (or rotating) storage units may be utilized to strengthen stream ciphers. In an implementation, relatively simple updates are combined with the efficient output rules of FIGS. 2 and 6. Such techniques may be used to construct a wide variety of new ciphers which may also be relatively efficient in software implementations.

A few exemplary update rules are discussed below including those based on random walks, T-functions, LFSRs (linear feedback shift registers), and word-based stream ciphers such as alleged RC4 (Ron's Code 4—variable-key-size encryption algorithm by Ron Rivest of RSA (Rivest, Shamir, and Adleman public key encryption technology)).

Ransom Walks on Expander Graphs

Expander graphs are natural sources of (pseudo)randomness, and they have numerous applications as extractors, derandomizers, etc. However, there are few problems that have to be resolved before expanders can be used in cryptographic applications.

In an implementation, the underlying graphs are assumed to be directed. The following walks are conveniently thought of as those on Cayley graphs. Generally, a Cayley graph over a G with generators s[1], . . . , s[n] has the elements of the group G as nodes and edges of the form (x,x∘s[i]).

If the graph is undirected, then it is known that the graph forms an expander graph and the random walk is rapidly mixing. In using undirected graphs, there may be two significant practical problems. First, the walks in such a graph have a constant probability of returning to an earlier node in constant number of steps. One way to solve this problem is to add the current state (e.g., as a binary string) to that of another process that has good short-term properties, but this may increase the storage size (e.g., cache size). If the graphs are directed, this problem can be handled, but one may still need to address the problem of ensuring the properties of expansion and rapid mixing. If the graph is given a Eulerian orientation, then expansion may be ensured. In addition, if the graph has a large directed girth, then the short term return probabilities can be minimized.

A few exemplary graphs that admit efficient implementation include:

Additive Walk. $x:=x+s[i]$. Here s is a table of random elements in the additive group modulo $2^n$.

Multiplicative Walk. $x:=x \cdot s[i] \bmod 2^n$. Here s is a table of random elements in the multiplicative group modulo $2^n$.

Gabber-Galil Walk. This graph has an update rule E that can be implemented with a shift and addition. As undirected graphs, these are shown to be expanders.

Ramanujan Walk. These are graphs defined by LPS (Lubotzky, Phillips, and Sarnak). These graphs may be relatively harder to implement efficiently. They are also proven to be good expanders and have a large girth (i.e., logarithmic in size of the graph) as undirected graphs. In an implementation, these graphs are used as directed graphs.

Permutation Walk. The graph is S, and the update rule E swaps two random locations. This walk is known to rapidly mix. This may be used as a model for the alleged RC4.

Random Walks with Dynamic Generators. This presents an update rule E for the Cayley graph's generators.

Iterated T-Functions for State Update

A class of invertible mappings $\{0,1\}^n \to [0,1]^n$ (called T-functions) allow introduction of non-linearity using elementary register operations (e.g., $\vee, \wedge, \oplus, *, +, -, x \mapsto \bar{x}, x \mapsto -x, <<$). In an implementation, T-functions are used to provide the update function, in part, for relatively faster software solutions.

An example of such a function is $f(x)=x+(x^2 \vee 5) \bmod 2^n$, for which the sequence $x_{i+1}=f(x_i)$ would span the entire domain in one cycle. In an implementation, each iteration requires only three cycles. Choosing n=64 and outputting the top half of $x_i$ (i.e., $H(x_i)=MSB_{32}(x_i)$) may result in a pseudorandom sequence that passes the statistical test suite for AES (advanced encryption services) candidates with significance level $\alpha=0.01$. The best known cryptanalytic depend on using the structure of the iterated output and generally take time $2^{cn}$, where c is a constant. Accordingly, the structure is important for proving the properties of these functions, and slightly altering the construction may destroy the property. These functions allow some of their parameters to be chosen at random subject to certain constraints. Implementations discussed herein are envisioned to resist such attacks with minimal overhead and extend the length of the underlying key for the stream cipher.

LFSR Rules for State Update and Combining Such Generators

A relatively large number of stream ciphers are based on linear-feedback shift registers (LFSRs) in part because they are suitable for hardware implementation, they produce sequences of relatively large period, they can produce sequences with relatively good statistical properties, and, because of their structure, they can be readily analyzed using algebraic techniques. The latter also necessitates the hiding of the LFSR's exact output sequence.

Various configurations of LFSRs may be utilized which combine the outputs in different ways such as shrinking generators, clock-based generators, those based on algorithm M (or MacLaren-Marsaglia algorithm) and/or algorithm B (or Bays-Durham trick), and the like. For further information regarding LFSRs and other cryptography basics, the reader is directed to a text written by A. Menezes, P. van Oorschot, and S. Vanstone entitled, "Handbook of Applied Cryptography," fifth printing (August 2001), published by CRC Press.

Word-Based Stream Ciphers on $S_{256}$

Word-based stream ciphers generally work at the byte level, e.g., using a compact representation of an element of $S_{256}$ as a table of 256 elements. An extension to $S_2^{32}$ may involve impractical table sizes with today's technology. As an alternative, the table coding $\sigma \in S_{256}$ may be extended into a word array by extending each entry in the table by adding 24 random bits, so that the table modulo 256 is still $\sigma$. Then, the entries in the table were updated while preserving the least-significant bytes using a function $f_{a,b}=ax+b$, where the elements a,b themselves were updated using random walks on $(Z_2^{32}, +)$ and $(Z_2^{32}, *)$.

Hardware Implementation

Figure 7:
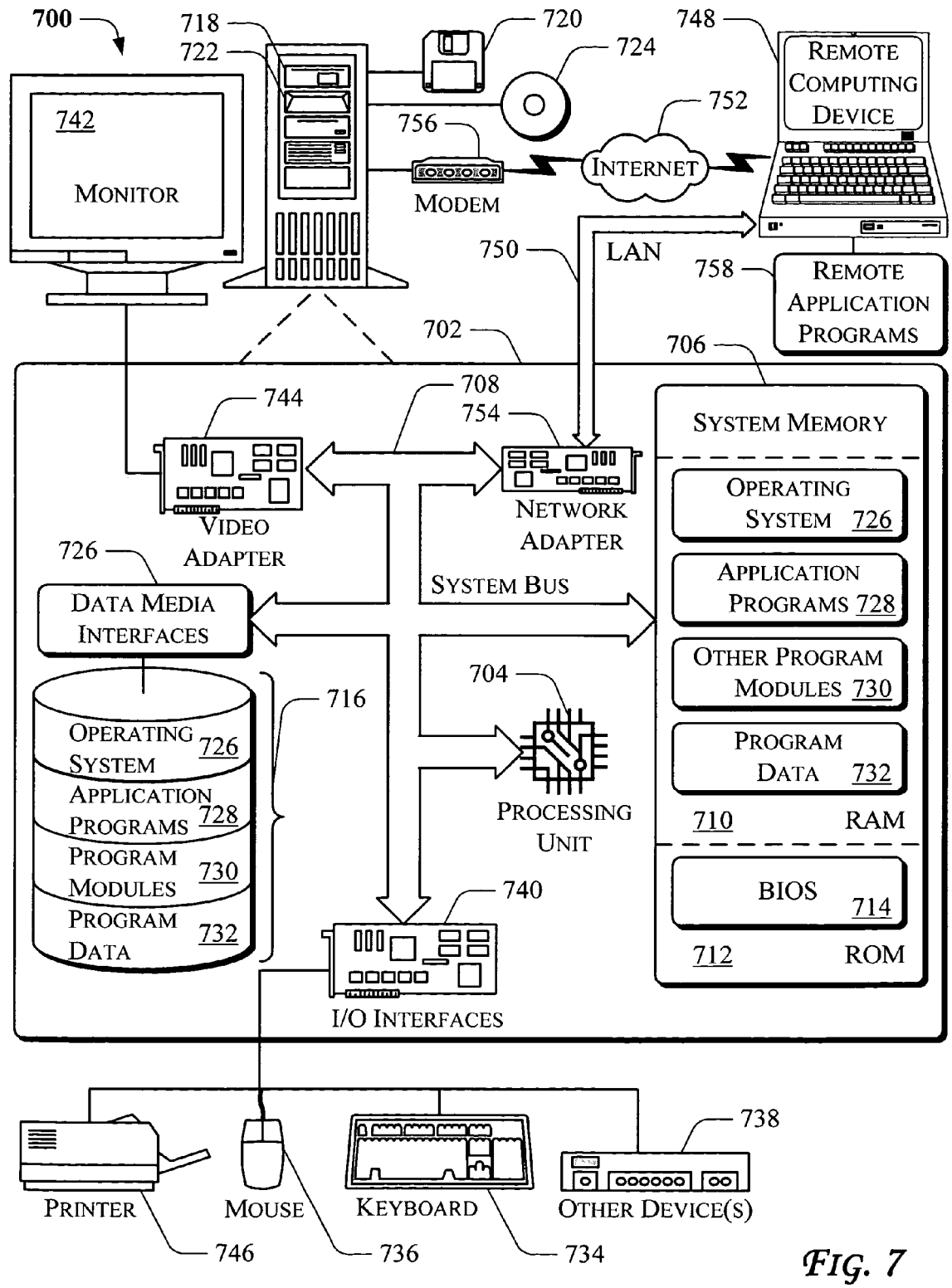
FIG. 7 illustrates a general computer environment 700, which can be implement the techniques described herein.

FIG. 7 illustrates a general computer environment 700, which can be used to implement the techniques described herein. For example, the computer environment 700 may be utilized to execute instructions associated with performing the tasks discussed with reference to the previous figures. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the exemplary computer environment 700.

Computer environment 700 includes a general-purpose computing device in the form of a computer 702. The components of computer 702 can include, but are not limited to, one or more processors or processing units 704 (optionally including a cryptographic processor or co-processor), a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer-readable media. Such media can be any available media that is accessible by computer 702 and includes both volatile and non-volatile media, removable and non-removable media.

The system memory 706 includes computer-readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer-readable instructions, data structures, program modules, and other data for computer 702. Although the example illustrates a hard disk 716, a removable magnetic disk 720, and a removable optical disk 724, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, game console, and the like. The remote computing device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to. store the desired information and which can be accessed by a computer.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared (IR), wireless fidelity (e.g., IEEE 802.11b wireless networking) (Wi-Fi), cellular, Bluetooth enabled, and other wireless media. Combinations of any of the above are also included within the scope of computer-readable media.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:

sequentially storing pointers to a plurality of results provided by a stream cipher output rule in a first, second, and third storage units;

providing a plurality of results from a pairing function, the pairing function pairing individual values from the first and third storage units that are at least a threshold value apart wherein the pairing function is $p(x,y)=x\oplus(ay+b)$, where a and b are two constants, and a is odd or $p(x,y)=\gamma,\delta$ is chosen as a nearly universal hash function by the iteration of the following rules:

$\alpha = ax \bmod 2^{2n}$ $\beta = by \bmod 2^{2n}$ $\gamma = \alpha^L + \beta^R \bmod 2^{2n}$ $\delta = \alpha^R + \beta^L \bmod 2^{2n}$, where $x^L$ and $X^R$ respectively denote the left and right halves of x, and a,b are chosen randomly; and upon reaching the threshold value of the output rule results, serially and recursively rotating contents of the first, second, and third storage units, wherein the contents of the storage units are the pointers.

2. A method as recited by claim 1, wherein a short-term correlation between the individual values from the first and third storage units are limited.

3. A method as recited by claim 1, wherein a length of each of the first, second, and third storage units equals the threshold value.

4. A method as recited by claim 1, wherein the first, second, and third storage units are implemented in a single memory device.

5. A method as recited by claim 1, wherein the serial rotation is performed by shifting the first, second, and third storage units in a same direction.

6. A method as recited by claim 1, wherein the pairing function results are stored in a table.

7. A method as recited by claim 1, wherein the method is utilized to strengthen an output of a stream cipher keystream generator.

8. A method as recited by claim 1, wherein only the first and third storage units are active at any given time.

9. A method as recited by claim 1, wherein the first and third storage units are initialized with random values.

10. A method as recited by claim 1, wherein the method is applied recursively.

11. A method as recited by claim 1, wherein the output rule is combined with one or more update rules selected from a group comprising random walks, T-functions, LFSRs (linear feedback shift registers), and word-based stream ciphers.

12. A method as recited by claim 11, wherein the random walks are selected from one or more walks in a group comprising an additive walk, a multiplicative walk, a Gabber-Galil walk, a Ramanujan walk, a permutation walk, and a random walk with a dynamic generator.

13. A method as recited by claim 1, further comprising enhancing the pairing function by utilizing a fourth storage unit.

14. A method as recited by claim 13, wherein the fourth storage unit is walked through using a one-cycle secret permutation.

15. A method as recited by claim 14, wherein the secret permutation slowly mutates.

16. A method as recited by claim 13, wherein the fourth storage unit is initialized with random values.

17. A method as recited by claim 13, wherein the fourth storage unit is initialized with random values and a variable delay.

18. A system comprising:
a processor;
a system memory coupled to the processor;
sequentially storing pointers to a plurality of results provided by a stream cipher output rule in a first, second, and third portion of the system memory;

providing a plurality of results from a pairing function, the pairing function pairing individual values from the first and third portions of the system memory that are at least a threshold value apart wherein the pairing function is $p(x,y)=x\oplus(ay+b)$, where a and b are two constants, and a is odd or $p(x,y)=\gamma,\delta$ is chosen as a nearly universal hash function by the iteration of the following rules:

$\alpha = ax \bmod 2^{2n}$ $\beta = by \bmod 2^{2n}$ $\gamma = \alpha^L + \beta^R \bmod 2^{2n}$ $\delta = \alpha^R + \beta^L \bmod 2^{2n}$, where $x^L$ and $x^R$ respectively denote the left and right halves of x, and a,b are chosen randomly; and upon reaching the threshold value of the output rule results, serially and recursively rotating contents of the first, second, and third portions of the system memory, wherein the contents of the system memory are the pointers.

19. A system as recited by claim 18, wherein a short-term correlation between the individual values from the first and third portions of the system memory are limited.

20. A system as recited by claim 18, wherein a length of each of the first, second, and third portions of the system memory equals the threshold value.

21. A system as recited by claim 18, wherein the first, second, and third portions are implemented in multiple memory devices.

22. A system as recited by claim 18, wherein the serial rotation is performed by shifting the first, second, and third portions in a same direction.

23. A system as recited by claim 18, wherein the pairing function results are stored in a table on the system memory.

24. A system as recited by claim 18, wherein the system is utilized to strengthen an output of a stream cipher keystream generator.

25. A system as recited by claim 18, wherein the first and third portions are initialized with random values.

26. A system as recited by claim 18, wherein the output rule is combined with one or more update rules selected from a group comprising random walks, T-functions, LFSRs (linear feedback shift registers), and word-based stream ciphers.

27. A system as recited by claim 26, wherein the random walks are selected from one or more walks in a group comprising an additive walk, a multiplicative walk, a Gabber-Galil walk, a Ramanujan walk, a permutation walk, and a random walk with a dynamic generator.

28. A system as recited by claim 18, wherein an operation of the pairing function is enhanced by utilizing a fourth portion of the system memory.

29. A system as recited by claim 28, wherein the fourth portion is initialized with random values.

30. A system as recited by 28, wherein the fourth portion is initialized with random values and a variable delay.

31. One or more computer storage media having instructions stored thereon that, when executed, direct a machine to perform acts comprising:

strengthening an existing stream cipher's output by sequentially storing pointers to a plurality of results provided by the stream cipher in a first, second, and third storage units;

providing a plurality of results from a pairing function, the pairing function pairing individual values from the first and third storage units that are at least a threshold value apart, wherein the pairing function is $p(x,y)=x\oplus(ay+b)$, where a and b are two constants, and a is odd or $p(x,y)=\gamma,\delta$ is chosen as a nearly universal hash function by the iteration of the following rules:

$\alpha = ax \bmod 2^{2n}$ $\beta = by \bmod 2^{2n}$ $\gamma = \alpha^L + \beta^R \bmod 2^{2n}$ $\delta = \alpha^R + \beta^L \bmod 2^{2n}$, where $x^L$ and $x^R$ respectively denote left and right halves of x, and a,b are chosen randomly;

upon reaching the threshold value of the existing stream cipher output, serially and recursively rotating contents of the first, second, and third storage units, thereby strengthening the cipher stream, wherein the contents of the storage units are the pointers; and outputting the now strengthened stream cipher.

32. One or more computer storage media as recited by claim 31, wherein a short-term correlation between the individual values from the first and third storage units is limited.

33. One or more computer storage media as recited by claim 31, wherein a length of each of the first, second, and third storage units equals the threshold value.

34. One or more computer storage media as recited by claim 31, wherein the first, second, and third storage units are implemented in a single memory device.

35. One or more computer storage media as recited by claim 31, wherein the serial rotation is performed by shifting the first, second, and third storage units in a same direction.

36. One or more computer storage media as recited by claim 31, wherein the pairing function results are stored in a table.

37. One or more computer storage media as recited by claim 31, wherein the acts are performed recursively.

38. One or more computer storage media as recited by claim 31, wherein the existing stream cipher is combined with one or more update rules selected from a group comprising random walks, T-functions, LFSRs (linear feedback shift registers), and word-based stream ciphers.

39. One or more computer storage media as recited by claim 38, wherein the random walks are selected from one or more walks in a group comprising an additive walk, a multiplicative walk, a Gabber-Galil walk, a Ramanujan walk, a permutation walk, and a random walk with a dynamic generator.

40. One or more computer storage media as recited by claim 31, further comprising enhancing the pairing function by utilizing a fourth storage unit.

* * * * *

UNITED STATES PATENT AND TRADEMARK OFFICE
CERTIFICATE OF CORRECTION

PATENT NO.         : 7,505,588 B2
APPLICATION NO.    : 10/815572
DATED              : March 17, 2009
INVENTOR(S)        : Ilya Mironov et al.

It is certified that error appears in the above-identified patent and that said Letters Patent is hereby corrected as shown below:

In column 2, line 6, before "reference" insert -- same --.

In column 2, line 20, before "implement" insert -- used to --.

In column 3, line 15, before "technique" insert -- a --.

In column 5, line 49, after "S[delay]" insert -- is used, --.

In column 11, line 18, in Claim 1, delete "$X^R$" and insert -- $x^R$ --, therefor.

In column 12, line 66, in Claim 30, after "recited by" insert -- claim --.

Signed and Sealed this
Nineteenth Day of July, 2011

David J. Kappos
*Director of the United States Patent and Trademark Office*